Jan. 28, 1964     G. P. HUNGERFORD     3,119,150
APPARATUS FOR PRODUCING SMOOTH, FLAT ROLLS OF FILM
Filed May 4, 1961     2 Sheets-Sheet 1
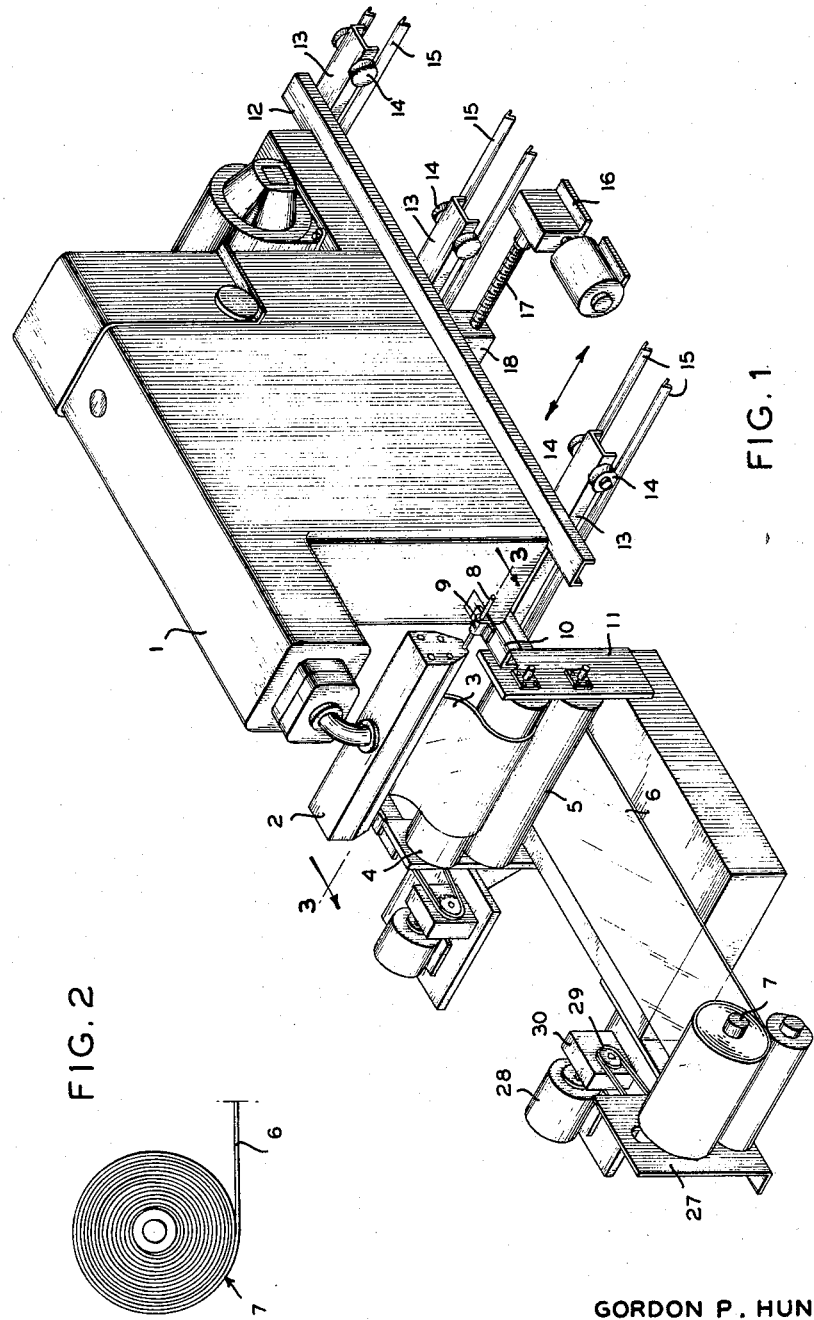
INVENTOR
GORDON P. HUNGERFORD
BY Mitchell G. Condos
ATTORNEY Jan. 28, 1964  G. P. HUNGERFORD  3,119,150
APPARATUS FOR PRODUCING SMOOTH, FLAT ROLLS OF FILM
Filed May 4, 1961  2 Sheets-Sheet 2
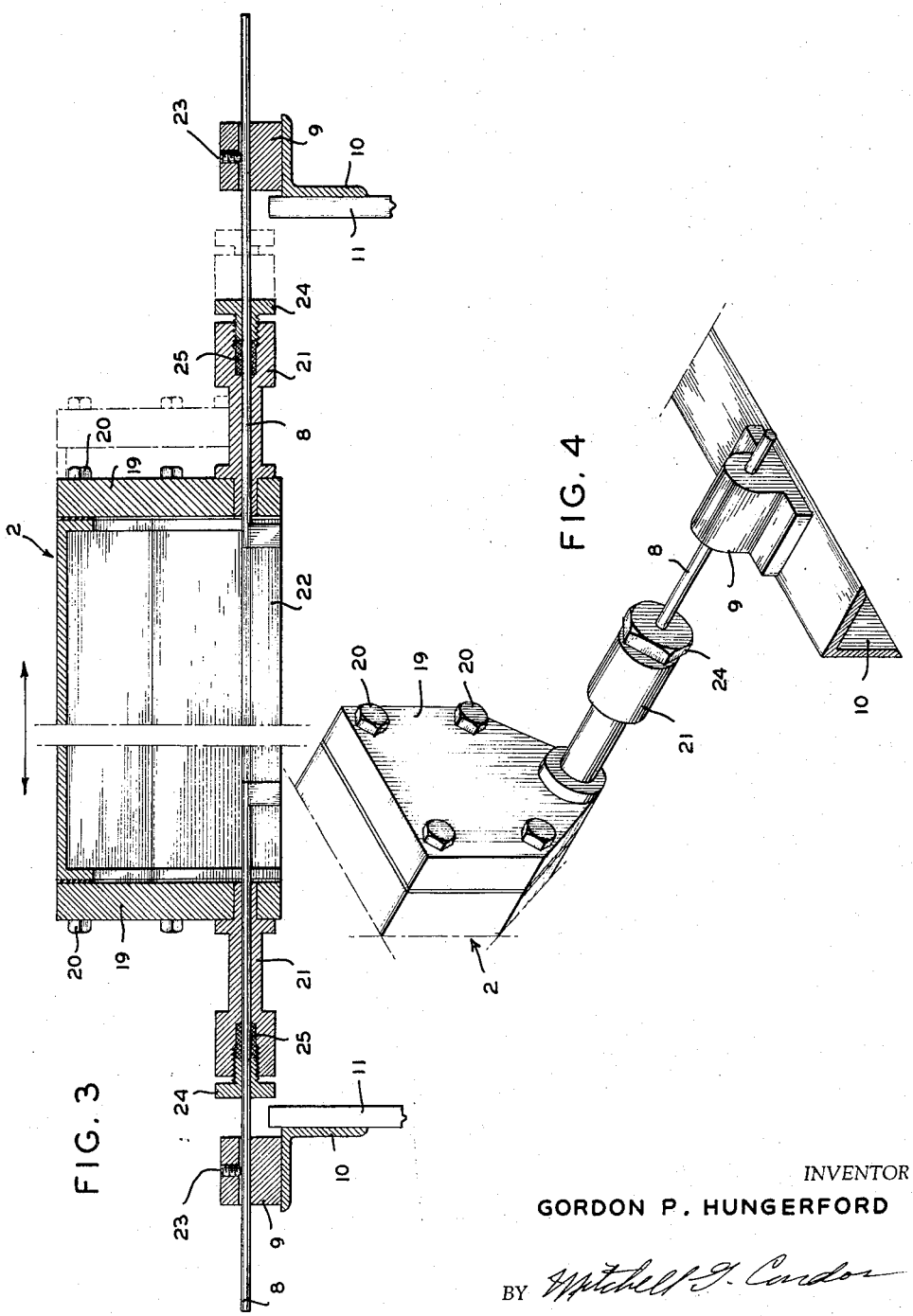
INVENTOR
GORDON P. HUNGERFORD
BY *Mitchell J. Cordon*
ATTORNEY

United States Patent Office 3,119,150
Patented Jan. 28, 1964

3,119,150
APPARATUS FOR PRODUCING SMOOTH, FLAT
ROLLS OF FILM
Gordon P. Hungerford, Pittsford, N.Y., assignor to
National Distillers and Chemical Corporation, New
York, N.Y., a corporation of Virginia
Filed May 4, 1961, Ser. No. 107,745
5 Claims. (Cl. 18—12)

The present invention relates to smooth, flat rolls of synthetic film, particularly films of thermoplastic polymers, and to methods and apparatus for producing such film and rolls thereof.

One of the best of the known methods for producing flat, lump-free rolls of film from thermoplastic materials is to extrude the film by the tubular inflated bubble process with provisions in the apparatus employed for either rotating the entire die, back and forth, through a relatively large arc, or rotating the cooling air ring. Such rotative actions cause gauge variations, resulting from inaccuracies of the die and air flow, to be distributed back and forth across the flattened tube or sheet thus formed, thereby seeking to avoid the build up of a heavy gauge spot at any one point in the roll of film. Such a method is relatively effective and, even when film of poor gauge uniformity is being produced, the rolls of film are substantially flat and smooth.

Newer possibilities for high speed manufacture of films of synthetic thermoplastic polymers include the extrusion of a molten web of the polymer from a die, such as a T slot die, and preferably through an air gap onto a chilled arcuate surface, such as a casting roll, and on which the molten web is completely or substantially solidified by maintaining the film on the roll until such solidification is obtained, followed by winding up the film on a subsequent wind-up roll. Such a method inherently possesses the possibility of use of extremely high linear speeds due mainly to the highly efficient cooling that results from intimate contact of the molten web with the chilled surface. However, such a method does not always provide entirely satisfactory production of smooth rolls of wound up film as, due mainly to unavoidable irregularities present in the die orifices, gauge uniformity of the extruded film is difficult to obtain to the extent of avoiding build up or "lumps" in the wound up rolls.

Still another method for producing film of thermoplastic synthetic polymers is that involving extrusion of a molten web of the polymer from a die orifice and passage of the molten web into a quenching bath (e.g., a water bath) for solidification of the film followed by winding up the solidified film on a wind up roll.

Generally speaking, and as aforesaid, such extrusion methods are inherently subject to preparation of rolls of film that are not of such uniformity in gauge to avoid objectionable build-up or "lumps" in the rolls of the wound up film. In endeavors to avoid such a problem, resort has been made to shifting the extruded web, back and forth, in a predetermined manner and winding up the cooled and set web without regard to edge wander and trimming off the edges of the set web. Although such methods may provide wound up rolls of film that are substantially smooth, a particular objectionable feature is that (apart from economic considerations) the back and forth oscillation of the solidified web sets up strains in the film whereby non-linear pay-off of the film from the wound roll occurs. Still other objectionable features of such methods include the inherently high loss of production due to the need for trimming off a substantial part of the web from the edges towards the longitudinal axis of the film, due to the substantial edge wander that has occurred. Obviously, in such methods, and illustrated by casting onto a chilled roll, the potential productivity of the apparatus is markedly decreased as a substantial part of the chilled roll surface is used for production of quantities of film (due to edge wander) that must be trimmed off and, and hence, is a loss of production.

Among the objects of the present invention is the production of substantially smooth, flat rolls of extruded thermoplastic synthetic polymer films despite irregularities in gauge uniformity of the extruded material and, attendant therewith, the provision of a method and apparatus that increases the productivity of certain extrusion processes by reducing the percentage of the extruded film that is required to be trimmed off and whereby the productivity of apparatus (e.g., chilled casting surfaces) is increased due to the utilization of an increased portion thereof in production of satisfactory film. Other objects and advantages will be apparent from the more detailed description of the invention set forth hereinafter, it being understood that various changes may be made therein without departing from the spirit and scope of the invention.

In connection with such more detailed description, reference is made to the accompanying drawings wherein:

FIGURE 1 is a perspective view of one form of apparatus embodying the present invention;

FIGURE 2 is an end elevational view of a roll of film produced by the instant process and apparatus;

FIGURE 3 is an enlarged fragmentary sectional view through the die taken on the line 3—3 of FIGURE 1; and FIGURE 4 is an enlarged and fragmentary perspective view illustrating one end of the die and the associated deckle structure.

In accordance with this invention, a synthetic film forming, thermoplastic material is extruded from a die orifice as a molten web followed by passage of the molten web into contact with an appropriate means for solidifying the web and, for example, by passage of the molten web into contact with a chilled casting surface, a liquid quenching bath etc., and to obviate difficulties as aforediscussed due to unavoidable variations often present in the die orifice or by reason of other causes, continuously shifting transversely the die orifice over the molten material being extruded therefrom while the longitudinal center line of the extruding molten web is maintained substantially constant.

As aforediscussed, and mainly due to variations in die orifice whereby irregularities in film thickness across the extruded web occurs and such a web is wound into a roll, "high spots" or areas of greater thickness develop and tend to overlie one another in successive convolutions of the roll whereby a "lump" results in the roll. Moreover, there may be produced a plurality of such depth irregularities in the film thereby providing a corresponding number of irregularities or "lumps" in the wound roll. By practice of this invention, whereby the die orifice is continuously reciprocated transversely over the extruding material while maintaining the center line of the extruded molten web substantially constant, the irregularities in the extruded and finished film are reciprocated in a substantially regular pattern of distances from longitudinal axis (or center line) of the film. As a result thereof, when the film is ultimately wound into a roll, the depth irregularities do not build up one above another in successive convolutions and there is provided a relatively wide distribution of the depth irregularities whereby the roll is evened out and is substantially smooth.

To obtain the desired oscillatory distribution of "high spots," the die itself can be reciprocated transversely in a direction substantially perpendicular to the longitudinal axis of the extruded web, as can be the case in instances wherein the extruder is connected to the die by a flexible conduit for passage of the molten material from the extruder into the die. In other instances the extruder and its associated die may be mounted such that both reciprocate transversely while the chilling means, as for example, when a chilled casting drum is used, is fixed against transverse movement. Still other arrangements may be employed as long as there is maintained a substantially constant center line for the extruded web while the die orifice is continuously shifted transversely over the extruded molten web.

As a means for accomplishing the desired results of this invention, provisions are made for varying the width of the extrusion orifice (i.e., the longest axis of the orifice) so that a single die may be modified selectively to produce extruded webs of different width. As a highly suitable means to accomplish same, there can be used a die, which desirably may be of the conventional T slot type, provided with so-called "deckle rods" that prevent flow of extrudate through the die orifice for certain predetermined distances at opposed extremities of the die and which deckle rods may be disposed within the die orifice by a distance which exceeds the extent of oscillation of the die. Thus, the deckle rods can be retained at a constant position while the die is reciprocated, laterally back and forth, at a slow rate whereby, in effect, the position of the molten web is maintained in substantially constant fixed position with, for example, a chilled roll or other means for solidifying the web while the lips of the die are moved back and forth relative to the relationship thereof to the extrudate or molten web. Not only does operation in such a manner cause the "lumps" due to variations in the die orifice to be moved back and forth without distortion of the web or introducing strains in the film as it is solidified and wound up but, of considerable importance, the equipment (e.g., casting rolls, etc.) is more fully utilized for production of film that requires less loss in edge trimming requirements.

Various synthetic organic film-forming materials may be utilized in practice of this invention depending on the particular properties desired. Thus, there may be used polyalkylenes such as polyethylene and polypropylene, in their many varieties, nylon type resins and compositions containing same; polyester resins such as polyethylene terephthalate, cellulose esters such as cellulose acetate, cellulose butyrate, cellulose acetate-butyrate; polyvinyl and polyvinylidene compositions, and various other polymers and copolymers as long as they have the properties enabling them to be fused and manipulated in the process and apparatus of this invention.

As examples of temperatures that may be used at the die lips for melts of various extrudable materials, the following is set forth:

| | ° F. |
|---|---|
| Polyethylene | 300–600 |
| Cellulose acetate (high acetal) | 450–550 |
| Cellulose acetate (low acetal) | 330–380 |
| Cellulose acetate butyral | 220–380 |
| Ethyl cellulose | 400–420 |
| Methyl methacrylate polymers | 460–490 |
| Nylon (extrusion and moulding grades) | 480–520 |
| Polyvinyl chloride ("Geon," "Ultron," etc.) | 270–370 |
| Copolymer of vinyl chloride and vinyl acetate ("Vinylite") | 270–370 |
| Polyvinyl-formal-acetate-butyral | 300–340 |

In the finished film, the gauge of the film may vary substantially, but, desirably, relatively thin films on the order of one mil or less, such as one-quarter mil or less, can be produced.

Referring to the drawings, and specifically FIGURE 1 thereof, there is illustrated apparatus, somewhat diagrammatically in which an extruder and die unit is reciprocated while a chilled casting roll unit remains fixed against transverse movement. In the embodiment shown, the extruder 1 feeds molten film-forming material (e.g., polyethylene) to the die 2 which is carried by the extruder and is provided with an orifice on the lower face thereof whereby extrudate in the form of a molten web 3 is extruded, passed through an air gap, and deposited as a drawn film on the surface of the upper chill roll 4 (internally cooled) and, in which embodiment, the film is maintained in contact with upper chill roll 4 until the web is substantially solidified and from which the film passes over a second chill roll 5 that, if necessary, completes the solidification of the web. A particularly wide range of temperatures may be employed, depending on the composition of the extrudate and whether or not it is desired to completely solidify the extruded web on one chill roll or to partially solidify on one roll and complete solidification on a subsequent roll or rolls. Thus, in example, where it is desired to achieve a film of high crystallinity from polyethylene, the temperature of the upper chill roll is generally on the order of 140° F. or higher; and where it is desired to achieve a somewhat lower film crystallinity, a temperature on the order of about 100° F. is desirable. Further, where it is desired to obtain a film having inherent stickiness, or sticking tendencies, a still lower temperature, such as about −20° F., is useful.

As the set film 6 leaves the chill roll 5, in the particular embodiment of the drawings, it is delivered to a wind up roll 7 carried upon a standard or bracket 27 mounted in fixed relationship with respect to the chill roll unit. A suitable motor 28 or the like may be provided for imparting rotative movement to the wind up roll through a chain or belt 29 and gear reduction mechanism illustrated diagrammatically at 30.

Although the particular embodiment of the drawings is directed to extrusion casting onto a chilled roll, it should be understood that it is within the scope of this invention to use means other than a chilled casting roll for solidifying the extruded molten web and, as an example, the extruded molten web can be quenched by passing same into a conventional quenching bath, or by spraying a cooling medium onto the molten web, etc., whereby the temperature of the film is reduced to that suitable for further treatment and wind up into roll form.

In the apparatus of the embodiment of the drawings, deckle rods 8 are shown in intimate association with the die opening or orifice to control the width of the extrudate and to prevent loss of extruded material. As shown, each deckle rod is mounted for lateral adjustability within a clamp 9 carried by a bracket 10 fixedly secured to structural element 11 forming part of the chill roll unit. However, the deckle rods may be supported in other suitable manner whereby, preferably, they will remain in adjusted fixed position and will not be affected by reciprocation of the die unit.

The deckle rods, as shown, are so positioned that when the extruder and chill roll units are positioned contiguously, a deckle rod will be supported in contact with each extremity of the die to close the end portion of the orifice thereof to the extent required for extrusion of a web of desired width. As illustrated more particularly in FIGURES 3 and 4 of the drawings, the die 2 may include end plates 19 retained in position by means of stud 20 or the like and each end plate includes a tubular bearing portion 21 within which a deckle rod 8 is supported for lateral movement. Thus, the inner extremities of the deckle rods project across the die orifice 22 and inward movement of the deckle rods (towards each other) will serve to restrict the width of the die orifice and control the width of the extrudate.

As aforesaid, each deckle rod is mounted within a clamp 9 for lateral adjustment in any desired manner. Thus, set screws 23, or the like, may be provided for locking a deckle rod in position. Other mechanical means may be utilized with equal facility. For smooth operation, the outer extremity of each tubular bearing portion 21 may be recessed for the reception of a threaded gland 24 through which a deckle rod 8 extends and a lubricant packing 25 is retained within the recess.

It will be readily understood, in the embodiment thus described, that reciprocation of the extruder 1 and die 2 as a unitary part thereof, will move the die regularly back and forth upon the deckle rods which remain fixed, the position of the die lips thus being reciprocated with respect to the extrudate passing therethrough. In this manner, the center line (i.e., longitudinal axis) of the web is maintained substantially constant while any irregularity in the die orifice will be distributed transversely across the extrudate and thus will not build up in successive convolutions in the finished roll of film.

To provide for the desired reciprocatory movement of die 2, the extruder unit 1 may be mounted, as shown, on a suitable carriage 12 or the like which may include a plurality of transversely disposed chassis members 13. Each of such chassis members is provided adjacent each extremity thereof with a pair of wheels 14 which ride upon rails or tracks 15 secured in parallel relationship upon the supporting surface. Traversing drive mechanism 16 is shown to provide for imparting reciprocatory movement to the extruder unit 1, such mechanism including a conventional screw element 17 which engages within a block 18 or the like, said block forming a unitary part of the extruder unit.

As a typical example of operating conditions, for extrusion of a polyethylene film utilizing an apparatus as shown in FIGURE 1, the following are set forth:

| | |
|---|---|
| Rate of oscillation of die | 35 seconds/cycle. |
| East to west | 15 seconds. |
| West to east | 20 seconds. |
| Extent of oscillation | 2¼″ east to west or vice versa. |
| Distance from die orifice to upper chill roll | 7½″. |
| Distance from die orifice to water surface | 5½″ (where water tank immersion or spray is used in lieu of chill roll). |
| Film web width | 65¼″. |
| Film thickness | 0.25 to 4.0 mils. |
| Die opening | 20 mils x 70″. |

In connection therewith, as the linear speed of the web at the die orifice is changed, the film thickness will vary. Under such circumstances, the rate of oscillation should be adjusted accordingly.

While preferred embodiments of the inventive concept have been described and illustrated, it should not be considered that the invention is limited thereto as it is possible to employ still other embodiments without departing from the inventive concept herein disclosed and it is desired therefore that only such limitations be improved on the appended claims as are stated therein.

What is claimed is:

1. In apparatus for producing relatively smooth flat rolls of extruded thermoplastic synthetic polymers in sheet form, the combination of a unit including an extruder, a die associated with said extruder and adapted to extrude from said die single layer molten film of said polymer, said die being mounted upon a pair of spaced deckle rods which project into the die and are maintained in fixed position, a unit including means adapted to receive and cool said molten film of polymer to solidified state, and means for continuously transversely reciprocating said die and, said deckle rods being associated with the orifice of said die for maintaining substantially constant the width and longitudinal axis of the extruded film.

2. An apparatus, as defined in claim 1, wherein the deckle rods are adjustable to control the width of the extruded film.

3. In an extrusion apparatus, a die having a transversely elongated orifice adapted for extrusion of a molten film of synthetic thermoplastic polymer, means adapted to transversely reciprocate said die, and adjustable means associated with said die adapted to maintain substantially constant the width and longitudinal axis of the film extruded from said die orifice, said last mentioned means comprising a deckle rod extending into said die from each end thereof, said deckle rods being laterally adjustable toward and from each other.

4. In apparatus for producing relatively smooth flat rolls of single layer film of thermoplastic synthetic polymers, the combination of an extruder and a die mounted thereupon and adapted to extrude molten film of said polymer from the orifice of said die, means for adjusting the width of said die orifice, said means comprising a deckle rod extending into said die from each end thereof, said deckle rods being mounted separately from said die within fixed guides and being laterally adjustable toward and from each other, a unit including means adapted to receive and cool said molten polymer film to solidified state, means for continuously reciprocating said die and extruder as a unit transversely of the film being extruded, and means for maintaining substantially constant the width and longitudinal axis of the extruded film.

5. An apparatus for producing smooth flat rolls of a single layer film of thermoplastic polymeric material, comprising in combination an extruder including an extruder die mounted thereon, said die having an elongated orifice adapted to discharge a molten film of said polymer; means for establishing the effective length of said orifice, thereby substantially to determine the width of the film discharged, including a pair of deckle rods having inner and outer ends, support means for the respective inner ends of said rods carried by said die and adapted to align said ends in opposed relation within said die orifice, and permitting reciprocal movement of said die and rods relative to each other; support means for the respective outer ends of said deckle rods adapted to engage said rods in adjustably fixed inner end relationship; and means for reciprocal movement of said extruder and die, as a unit, in a limited path, substantially parallel to the axis of said deckle rods.

References Cited in the file of this patent

UNITED STATES PATENTS

| | | |
|---|---|---|
| 2,365,326 | Bailey | Dec. 19, 1944 |
| 2,408,627 | Green | Oct. 1, 1946 |
| 2,499,421 | Sampler | Mar. 7, 1950 |
| 2,567,704 | Grimes | Sept. 11, 1951 |
| 2,697,852 | Bailey | Dec. 28, 1954 |
| 2,809,142 | Beeber et al. | Oct. 6, 1957 |
| 2,825,558 | Devaud | Mar. 4, 1958 |
| 2,859,475 | Tornberg | Nov. 11, 1958 |
| 2,982,995 | Groleau | May 9, 1961 |